May 27, 1958 P. BERTELL ET AL 2,836,104
REAR VISION MIRROR MOUNTING
Filed Dec. 13, 1954 2 Sheets-Sheet 2
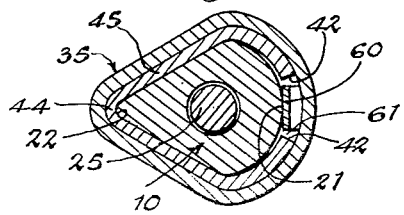
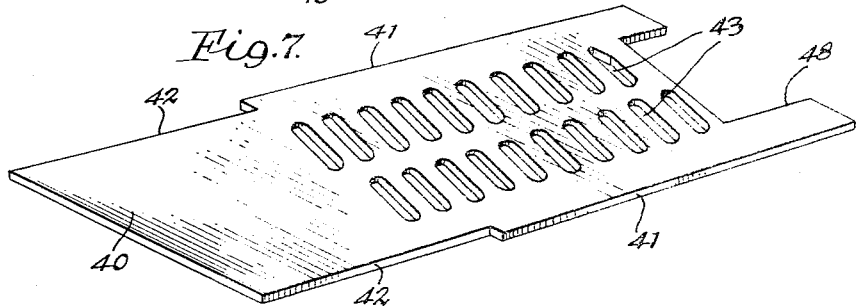
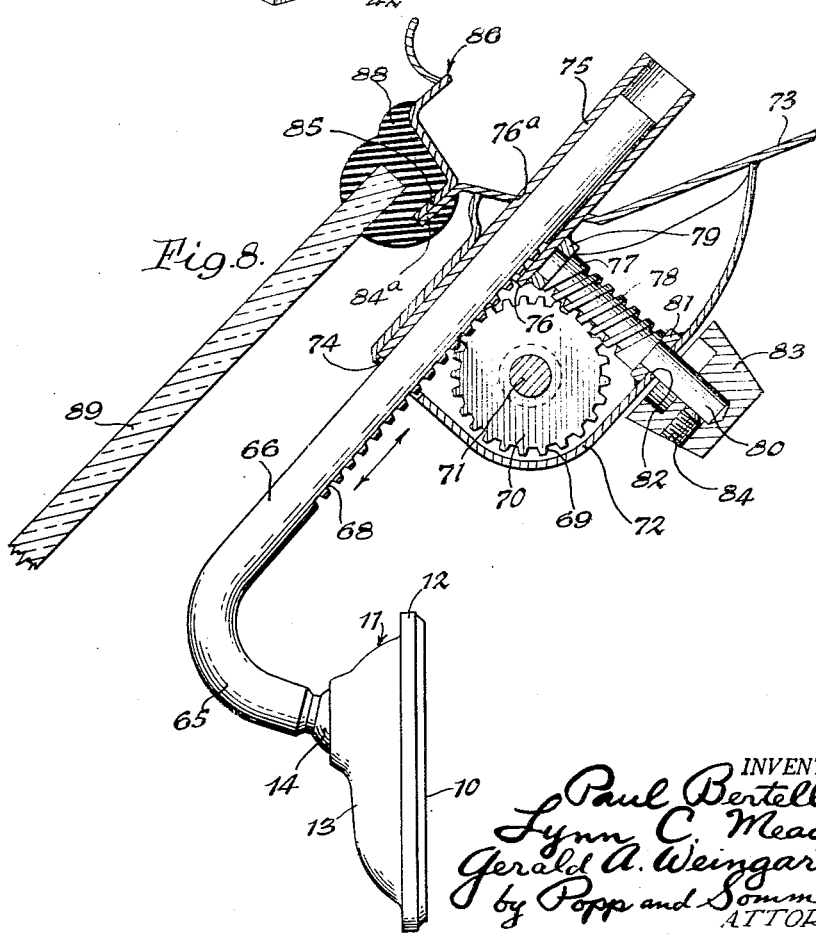
INVENTORS
Paul Bertell
Lynn C. Meade
Gerald A. Weingartner
by Popp and Sommer
ATTORNEYS

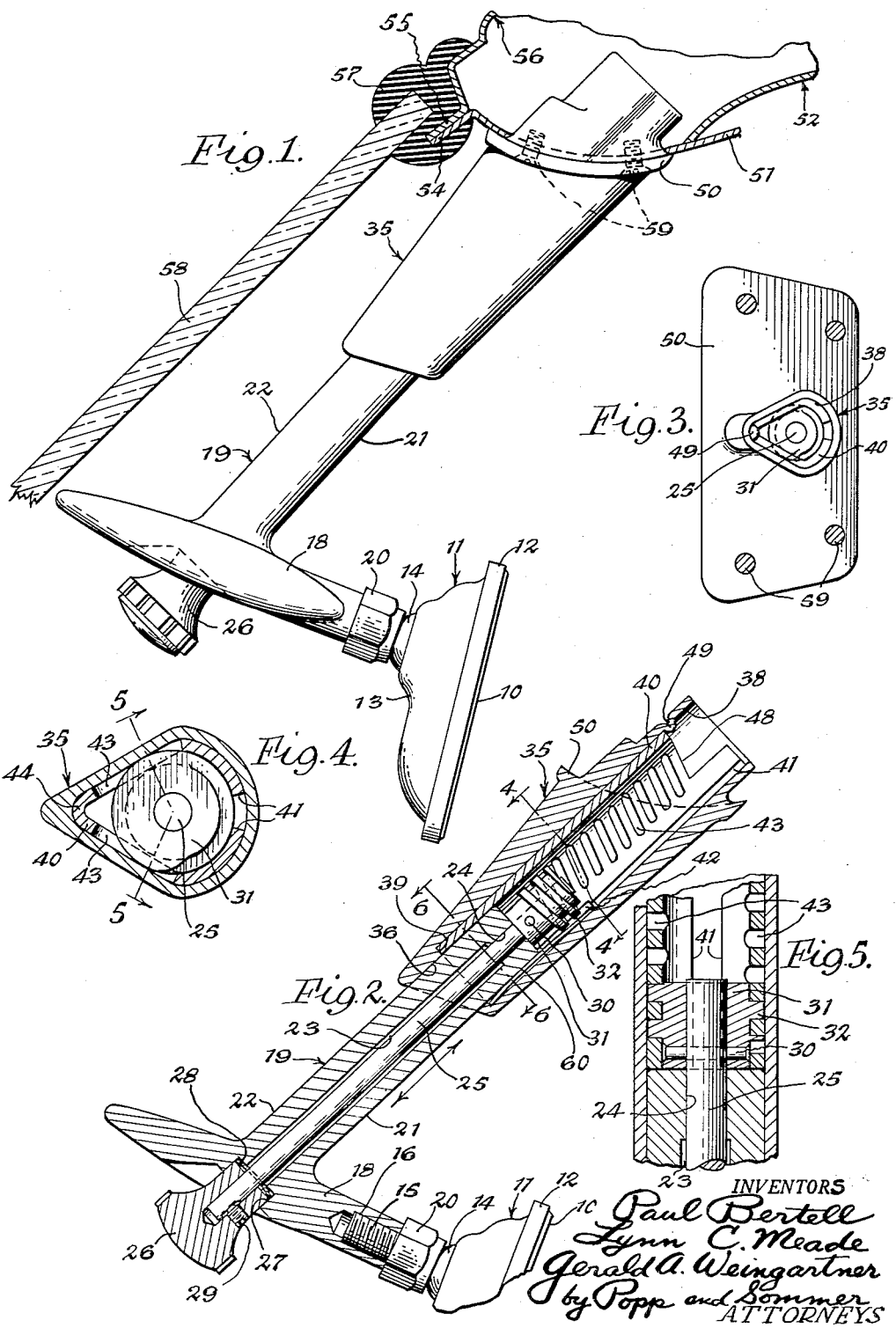

United States Patent Office 2,836,104
Patented May 27, 1958

2,836,104
REAR VISION MIRROR MOUNTING

Paul Bertell, Kenmore, Lynn C. Meade, Buffalo, and Gerald A. Weingartner, Kenmore, N. Y., assignors, by mesne assignments, to Standard Mirror Company, Inc., Buffalo, N. Y., a corporation of New York Application December 13, 1954, Serial No. 474,852

9 Claims. (Cl. 88—98)

This invention relates to a rear vision mirror mounting and more particularly to a mounting for a rear vision mirror panel adapted for use within a pleasure automobile and which reflects to the driver of the automobile the view through the rear window thereof.

The present trend toward larger rear windows and larger windshields in pleasure cars permits the use of a larger rear vision mirror panel inside of the car, this being desirable, of course, to provide a larger rear vision view to the driver of the automobile. On the other hand, such larger rear vision mirrors result in an increased obstruction to the vision of the driver forwardly through the windshield. The effect of the rear vision mirror in obstructing the forward view is a serious consideration, particularly with taller drivers and particularly with the lowering of the roofs of automobiles and the provision of vertically adjustable seats.

It has been found that relatively slight adjustments of the vertical position of the rear vision mirror panel will permit a larger rear vision mirror panel to be used in rear of the upper part of the windshield without undesirably obstructing the forward view of the driver through the windshield. It is accordingly one of the principal objects of the present invention to provide a mounting for an interior rear vision mirror for an automobile which is manually vertically adjustable as well, of course, as being tiltable about either a horizontal or vertical axis, to reflect the required view and also capable of being leveled.

Another object of the invention is to provide such a mounting in which this adjustment can be effected by a simple manual manipulation of the mirror and which does not require tools.

Another object of the invention is to provide such a mirror mounting which has the requisite degree of sensitivity in its adjustment, but at the same time can be rapidly brought to the desired elevation.

Another object is to provide such a rear vision mounting which maintains its adjustment and wherein there is a minimum tendency for the mirror panel to lose its adjustment under the effects of vibration and jar.

Another object of the invention is to provide such a rear vision mirror assembly which is free from undesirable vibratory movement in use.

Another object of the invention is to provide such a mounting which can be used both with conventional plane mirrors as well as with the so-called prismoidal mirrors as shown in the Bertell and Meade Patent, No. 2,640,-394 dated June 2, 1953 for Rear Vision Mirror.

Another object is to provide such a rear vision mirror which is of strong and durable construction and at the same time is low in cost.

Another object of the invention is to provide such a rear vision mirror which is of pleasing and attractive appearance when viewed from any direction.

Other objects and advantages of the invention will be apparent from the following description and drawings in which:

Fig. 1 is a side elevational view of a rear vision mirror having a mounting embodying the present invention, a part of the automobile roof and automobile windshield being shown in section.

Fig. 2 is a fragmentary, vertical, longitudinal section therethrough.

Fig. 3 is a top plan view of the attaching portion of the rear vision mirror mounting, the attaching screws being shown in section.

Fig. 4 is a sectional view taken on line 4—4, Fig. 2.

Fig. 5 is a fragmentary section taken generally on line 5—5, Fig. 4.

Fig. 6 is a section taken on line 6—6, Fig. 2.

Fig. 7 is a perspective view of the blank which is filled to form the sleeve which forms a rack cooperating with the teeth of a worm wheel.

Fig. 8 is a view similar to Fig. 1 and showing a modified form of the invention.

In the form of the invention shown in Figs. 1–7, the rear vision mirror mounting embodying the present invention is shown as supporting a glass mirror panel 10 which can be of any suitable outline and is shown as secured within a metal case 11 the marginal part 12 of which forms a bezel which is formed to embrace the beveled margin of the mirror panel 10. The central part of the metal case 11 is dished rearwardly, as indicated at 13, and is provided with an opening which contains a ball 14, the major part of this ball being disposed within the case 11. The case 11 is frictionally mounted upon this ball 14 in any suitable manner as disclosed, for example, in the Bertell application for Rear Vision Mirror Assembly, Serial No. 359,386 filed June 3, 1953, now Patent No. 2,763,188, dated Sept. 18, 1956. The mirror case can therefore be moved to different positions about the ball 14 and hence capable of being moved about a vertical axis and about a horizontal axis extending transversely of the automobile as well as permitting the miror to be moved to a level position.

The supporting ball 14 has an integral threaded stem 15 which is screwed into the threaded bore 16 of the lateral extension 18 of a vertically adjustable supporting rod member 19. Desirably, a lock nut 20 is provided to insure a shake proof connection between the threaded stem 15 and the extension 18.

The supporting rod 19 is preferably straight and out-of-round in cross section and for so-called streamlined appearance is shown as being of uniform teardrop shape in cross section having a blunt rounding nose 21 and a tapered tail part 22. This supporting rod 19 is provided with a longitudinal through bore 23 the upper end of which is of reduced diameter to provide a bearing 24 for an adjusting shaft 25. The lower end of the bore 23 is of enlarged diameter to provide a bearing 27 for the hub or reduced part of an adjusting knob 26. Preferably a thrust washer 28 is interposed between the knob 26 and the shoulder provided by the enlarged bearing 27 and the knob 26 is provided with a set screw 29 so that the knob can be immovably attached to the adjusting shaft 25. To the upper end of the adjusting shaft 25 is pinned, as indicated at 30, a worm 31 having the usual helical thread 32, the hub of this worm having thrust bearing engagement with the upper end of the adjusting rod 19. It will be seen that this worm 31, adjusting shaft 25 and knob 26 are capable of being turned in the adjusting rod 19 but are incapable of moving lengthwise with reference to this rod.

The number 35 represents the attaching member of the mounting end which is preferably in the form of a die-casting. At its lower end, this attaching member is provided with an opening 36 which conforms to the cross sectional shape of the adjusting rod 19, this rod being slidingly fitted in this opening. This opening forms a reduced end of a through bore 38 in the attaching portion 35, this bore 38 being of the same cross sectional shape as the opening 36 and stem 35 but of larger diameter to provide a shoulder 39. This bore inclines downwardly toward the front of the automobile. Into this enlarged portion of the bore 38 and against the shoulder 39 is fitted a plate 40 which is formed into a tube or sleeve having the cross sectional shape of the bore 38 and hence is out-of-round or teardrop shape in cross section. This plate, before being formed into a tube or sleeve, is illustrated in Fig. 7 and from this illustration, it will be noted that the opposite longitudinal edges 41 are notched at one end as indicated at 42 and that this plate is provided with two series of slots or teeth 43, these series being in the form of two parallel rows with the rows extending lengthwise of the plate and with each slot inclined and with the slots of one row arranged out of register with the slots of the other row. The plate is bent along its longitudinal center line to provide the sharp bend or tail edge 44 of the sleeve tube 40 and the slotted portions of the plate 40 form straight sides 45, the remaining side portions of the plate 40 curving to provide the rounding nose portion of the formed tube or sleeve. When so bent, the slots 43 of the two rows come into helical relation with one another so as to form two series of helically arranged teeth which engage the thread 32 of the worm 31. It will therefore be seen that the sleeve or tube 40 so formed from the blank plate illustrated in Fig. 7 is a rack having a longitudinal series of teeth 43 engaging and cooperating with the thread 32 of the worm 31.

The plate shown in Fig. 7 also has an end notch 48. This end notch 48 is disposed at the upper end of the attaching part 35 of the mounting as best illustrated in Fig. 2. In order to secure the rack or tube 40 in the enlarged part of the bore 38, a dimple or teat 49 is punched inwardly from the side wall of the attaching portion 35 against the edge of the notch 48 as best shown in Fig. 2. It will be seen that the sleeve or tube 40 is thereby confined between the shoulder 39 and the teat or dimple 49 and since this tube is out-of-round in form, it is immovable with respect to the attaching portion 35.

The attaching portion 35 is provided near its upper end with an external attaching flange 50 which is shown as being curved to fit the underside of a cross plate 51 of the ceiling 52 of the automobile. This cross plate is shown as terminating in a flange 54 which is in face-to-face relation with a flange 55 of the metal roof 56 of the automobile. The composite flange 54, 55 is shown as housed within a slot in the rubber frame 57 for a glass windshield 58. For pleasing appearance, the supporting rod 19 and attaching portion 35 preferably extend generally parallel with this windshield 58, that is, they incline downwardly toward the front of the automobile, and the movement of the stem 19 is parallel with this windshield.

The flange 50 of the attaching portion 35 is preferably secured to the ceiling plate 51 of the automobile by screws 59.

It is important to provide yielding frictional resistance in the mounting so that the parts do not shake out of adjustment. To this end, a small arching leaf spring 60 is employed. When the metal plate shown in Fig. 7 is curved into the cross sectional form shown in Fig. 6, it will be seen that the notches 42 in this plate form a longitudinally extending recess 61 as illustrated in Fig. 6 and that one end of this recess is formed with the shoulder 39 as illustrated in Fig. 2. Before the adjusting rod 19 is inserted into its slideway 36 and the enlarged part 38 of the bore, the arching spring leaf 60 is inserted into this recess 61 with its center arching toward the center of the through bore 38. As the adjusting rod 19 is moved upwardly in the bore 38, its rounding nose 21 engages the arching spring 60 and compresses it into its recess 61. Accordingly, this spring frictionally engages the rounding nose 21 of the adjusting rod 19 in all positions of adjustment of the rod 19.

In the operation of the form of the invention shown in Figs. 1–7, the driver of the automobile grasps the bezel 12 of the mirror panel 10 and turns the case 11 frictionally about the ball 14 until it is at the right angle both horizontally and vertically to reflect into his eyes the view from the rear window of the automobile. If, with this adjustment, the mirror panel is so low as to obstruct his forward vision to an undesirable extent or so high as to not reflect the desired view through the rear window to the car, he turns the knob 26 so as to move the mirror panel 10 vertically to the desired position. Turning this knob turns the adjusting shaft 25 and worm 31. Since the thread of the worm 31 is in engagement with the helical series of teeth or slots 43 of the stationary sleeve 40, such turning of the worm 31 causes it, and the adjusting shaft 25 and knob 26, to move longitudinally along the stationary sleeve 40. Since the adjusting rod 19 is confined between the hubs of the worm 31 and the knob 26, the stem is therefore likewise constrained to move longitudinally up or down the tube 40, this stem sliding in the slideway 36 provided at the lower end of the attaching portion 35. It will particularly be seen that the provision of the tube 40, particularly with its flat sides 45 and which contain the two series of notches or slots 43 provides a very simple and low cost method of providing a rack engageable with the helices of the worm 31. It will further be seen that the provision of the teat or dimple 49 provides a very simple method of confining this sleeve 40 in the enlarged part of the through bore 38.

It is important to provide resilient frictional resistance to the movement of the adjusting rod 19 through the bore 38 and this is provided by the arching spring leaf 60. As best shown in Fig. 2, this arching spring leaf is confined in the longitudinal recess 61 provided by the mating notches 42 of the sleeve or tube 40. From Fig. 2, it will be seen that this spring arches into resilient frictional engagement with the rounding nose portion 21 of the adjusting rod 19 and that this resilient friction tends to hold the rod in any set position of adjustment.

The form of the invention shown in Fig. 8 has the same mirror panel 10 mounted in a bezel 12 of a case 11 and which case has a central part 13 which is dished rearwardly to hold a ball 14, these parts being the same as in the preferred form of the invention illustrated in Figs. 1–7 and the same reference numbers therefore being employed. In the form of the invention shown in Fig. 8, however, the ball 14 is shown as being integral with a gooseneck 65 provided at the lower end of a round supporting rod 66. On the side of the supporting rod, from which the gooseneck 65 projects, it is provided with a longitudinal series of teeth 68 forming a rack engageable with the teeth 69 of a worm gear 70. This worm gear is shown as having a shaft 71 which is journalled in any suitable manner within a shell or case 72 and which case can be secured in any suitable manner to the underside of the roof plate 73 of the automobile. The stem 66 extends through an opening 74 in the case or shell 72 and is slidingly fitted in a sleeve or tube 75, the lower end of which is slotted, as indicated at 76, to permit engagement between the worm wheel 70 and the rack teeth 68. The upper end of the tube 75 can extend through an opening 76a in the roof plate 73. A worm 77 has its thread 78 in engagement with the teeth 69 of the worm wheel 70. One end of the worm 77 is journalled in a bearing 79 secured to the tube 75 and the other end 80 of this worm is journalled in a bearing 81 secured to the case or shell 72. The other end 80 projects from an opening 82 in the shell or case 72 and has a knob 83 secured to the projecting end 80 of the worm 78 by a set screw 84.

As with the form of the invention shown in Fig. 1, the roof panel 73 is provided with a flange 84a which mates with a flange 85 of the metal roof 86 of the automobile. The composite flange 84a, 85 fits into a groove provided in the rubber frame 88 for the glass windshield 89.

It will be seen that turning the knob 83 turns the worm 78 in its bearings 79 and 81. This turns the worm wheel 70 and its shaft 71. This, in turn, through the rack teeth 68, moves the adjusting rod 66 vertically either upwardly or downwardly to adjust the mirror panel 10 to the desired elevation.

From the foregoing, it will be seen that the present invention provides a very simple and low cost mounting for a rear vision mirror which permits of adjusting the mirror panel to an elevation suitable for the particular driver or other conditions such as the elevation of the driver's seat. It will further be seen that the adjustment is easily effected without the use of any tools and at the same time hold its adjustment even when subjected to normal vibration. It will also be seen that the mounting is pleasing in appearance and can be used in connection with any type of rear vision mirror panel including the prismoidal type of mirror previously referred to.

We claim:

1. A mounting for a rear vision mirror panel for an automobile, comprising an upwardly extending supporting rod member having a longitudinally slidable upwardly extending upper part and having a lower end arranged at an angle to said upper part to project horizontally toward the rear of the automobile, universal joint means movably securing said mirror panel to the rear part of said lower end of said supporting rod member, an attaching member adapted to be secured to an automobile body and having a downwardly extending bore open at its lower end and slidingly receiving said upper part of said supporting rod member, said supporting rod member being provided with a longitudinal through bore, an adjusting shaft journalled in said last bore, a worm having a helical thread fast to the upper end of said adjusting shaft and housed within said bore in said attaching member, an external adjusting knob fast to the lower end of said adjusting shaft, and a longitudinal row of teeth provided within and fast to said attaching member and meshing with said helical thread to move said upper part of said supporting rod member lengthwise of said bore in said attaching member when said knob and rod are manually turned.

2. A mounting for a rear vision mirror panel for an automobile, comprising an upwardly extending supporting rod member having a longitudinally slidable upwardly extending upper part and having a lower end arranged at an angle to said upper part to project horizontally toward the rear of the automobile, universal joint means movably securing said mirror panel to the rear part of said lower end of said supporting rod member, an attaching member adapted to be secured to an automobile body and having a downwardly extending bore open at its lower end and slidingly receiving said upper part of said supporting rod member, a worm journalled on one of said members and having a helical thread, an external manual knob operatively connected with said worm, a longitudinal row of teeth provided in the other of said members and meshing with said helical thread to move the upper part of said supporting rod member lengthwise of said bore in said attaching member when said knob and worm are manually turned, and an arching leaf spring interposed between the wall of said bore in said attaching member and said upper end of said supporting rod member to functionally resist movement of the latter.

3. A mounting for a rear vision mirror panel for an automobile, comprising an upwardly extending supporting rod member having a longitudinally slidable upwardly extending upper part and having a lower part arranged at an angle to said upper part to project horizontally toward the rear of the automobile, universal joint means movably securing said mirror panel to the rear part of said lower end of said supporting rod member, an attaching member adapted to be secured to an automobile body and having a downwardly extending bore open at its lower end, a longitudinally split metal sleeve lining said bore and slidingly receiving said upper part of said supporting member, a worm journalled on one of said members and having a helical thread, an external manual knob operatively connected to turn said worm, and a longitudinal row of teeth provided on the other of said members and meshing with said helical thread to move the upper part of said supporting rod member lengthwise of said bore in said attaching member when said knob and worm are manually turned.

4. A mounting for a rear vision mirror panel for an automobile, comprising an upwardly extending supporting rod member having a longitudinally slidable upwardly extending upper part and having a lower part arranged at an angle to said upper part to project horizontally toward the rear of the automobile, universal joint means movably securing said mirror panel to the rear part of said lower end of said supporting rod member, an attaching member adapted to be secured to an automobile body and having a downwardly extending bore open at its lower end, a longitudinally split metal sleeve lining said bore and slidingly receiving said upper part of said supporting member, said supporting rod member being provided with a longitudinal through bore, a worm having a helical thread fast to the upper end of an adjusting shaft and housed within said split sleeve, and an external adjusting knob fast to the lower end of said adjusting shaft, said split sleeve being provided with a longitudinal row of notches meshing with said helical thread to move said upper part of said supporting rod member lengthwise of said bore in said attaching member when said knob and adjusting shaft are manually turned.

5. A mounting for a rear vision mirror panel, comprising an upwardly extending supporting rod member having a longitudinally slidable upwardly extending upper part and having a lower end arranged at an angle to said upper part to project horizontally toward the rear of the automobile, universal joint means movably securing said mirror panel to the rear part of said lower end of said supporting rod member, an attaching member adapted to be secured to an automobile body and having a downwardly extending bore open at its lower end and slidingly receiving said upper part of said supporting rod member, a longitudinal row of teeth in the upper part of said supporting rod member, a worm wheel journalled in said attaching member with its teeth in engagement with said row of teeth, a worm journalled in said attaching member and meshing with said worm wheel, and an external knob turning said worm.

6. A mounting for a rear vision mirror panel for an automobile, comprising an upwardly extending supporting rod member having a longitudinally slidable upwardly extending upper part which is out-of-round in cross section and having a lower end arranged at an angle to said upper part to project horizontally toward the rear of the automobile, universal joint means movably securing said mirror panel to the rear part of said lower end of said supporting rod member, an attaching member adapted to be secured to the automobile body and having a downwardly extending bore open at its lower end and slidably receiving said upper part of said supporting member, a tubular sleeve lining said bore and of a cross sectional shape conforming to said bore and in which said upper part of said supporting rod member is fitted, said tubular sleeve being provided with at least one row of helically disposed notches forming rack teeth, said upper part of said supporting rod member being provided with a longitudinal through bore, an adjusting shaft journalled in said last bore, a worm fast to the upper end of said adjusting shaft with its helical thread engaging said row of helically disposed notches, and a knob fast to the lower end of said adjusting shaft.

7. A mounting for a rear vision mirror panel as set forth in claim 6 wherein said tubular sleeve is provided with two rows of said helically disposed notches forming rack teeth.

8. A mounting for a rear vision mirror panel as set forth in claim 7 wherein said tubular sleeve is longitudinally split along a line between said rows of notches.

9. A mounting for a rear vision mirror panel as set forth in claim 8 wherein the opposing edges of said tubular sleeve along said line are notched to provide a longitudinal recess, and an arching leaf spring arranged in said recess and compressively interposed between said bore in said attaching member and said upper end of said supporting rod member to frictionally resist movement of the latter.

References Cited in the file of this patent

UNITED STATES PATENTS

| | | |
|---|---|---|
| 1,584,087 | Gelder | May 11, 1926 |
| 1,646,379 | Whitehead | Oct. 18, 1927 |
| 1,828,924 | Chardell et al. | Oct. 27, 1931 |
| 2,026,722 | Wollensak | Jan. 7, 1936 |
| 2,384,710 | Trippensee | Sept. 11, 1945 |
| 2,467,266 | Lumsden | Apr. 12, 1949 |
| 2,717,531 | Schenck | Sept. 13, 1955 |

FOREIGN PATENTS

| | | |
|---|---|---|
| 802,789 | Germany | Feb. 26, 1951 |